United States Patent
Purushothaman et al.

(10) Patent No.: US 9,262,914 B2
(45) Date of Patent: Feb. 16, 2016

(54) ROGUE VEHICLE DETECTION

(75) Inventors: Balamuralidhar Purushothaman, Bangalore (IN); Rajan Mindigal Alasingara Bhattachar, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/348,294

(22) PCT Filed: Sep. 7, 2012

(86) PCT No.: PCT/IN2012/000597
§ 371 (c)(1),
(2), (4) Date: Mar. 28, 2014

(87) PCT Pub. No.: WO2013/093933
PCT Pub. Date: Jun. 27, 2013

(65) Prior Publication Data
US 2014/0222323 A1    Aug. 7, 2014

(30) Foreign Application Priority Data
Sep. 29, 2011    (IN) .......................... 2750/MUM/2011

(51) Int. Cl.
*G01G 1/00*       (2006.01)
*G06Q 30/00*      (2012.01)
(Continued)

(52) U.S. Cl.
CPC .............. *G08G 1/00* (2013.01); *G06Q 30/0201* (2013.01); *G06Q 40/08* (2013.01)

(58) Field of Classification Search
CPC ........ G08G 1/00; G06Q 30/021; G06Q 40/08
USPC ...................................................... 701/117
See application file for complete search history.

(56) References Cited

U.S. PATENT DOCUMENTS

| | | |
|---|---|---|
| 6,392,564 B1 | 5/2002 | Mackey et al. |
| 6,546,119 B2 | 4/2003 | Ciolli et al. |

(Continued)

FOREIGN PATENT DOCUMENTS

| | | |
|---|---|---|
| WO | WO 00/50983 | 8/2000 |
| WO | WO/00/50983 A1 | 8/2000 |

(Continued)

OTHER PUBLICATIONS

Abbotts, Chris: "Controversial new iPhone app creates crime reporting social network", found at http://www.wach.com/news/story.aspx?id=554419#.U1AZ71VdXHV, published online: Dec. 14, 2010.

(Continued)

*Primary Examiner* — Fadey Jabr
*Assistant Examiner* — Yazan A Soofi
(74) *Attorney, Agent, or Firm* — Hamre, Schumann, Mueller & Larson, P.C.

(57) ABSTRACT

The present subject matter relates to a method for rogue vehicle detection. The method includes receiving at least one violation report for a vehicle from at least one mobile communication device. The at least one violation report is indicative of a traffic violation made by the one or more vehicles. The method further includes categorizing the vehicle as a rogue vehicle, based on at least one rogue vehicle detection metric, the at least one rogue vehicle detection metric being determined from the violation report. The method also includes compiling a traffic observation record based on at least one of the violation report and the rogue vehicle detection metric.

14 Claims, 3 Drawing Sheets

(51) Int. Cl.
  *G06Q 40/00* (2012.01)
  *G08G 1/00* (2006.01)
  *G06Q 30/02* (2012.01)
  *G06Q 40/08* (2012.01)

(56) References Cited

U.S. PATENT DOCUMENTS

| | | | |
|---|---|---|---|
| 7,379,879 B1* | 5/2008 | Sloo | 705/325 |
| 2006/0112103 A1 | 5/2006 | Besserman et al. | |
| 2009/0233631 A1* | 9/2009 | Butler et al. | 455/466 |
| 2011/0077028 A1 | 3/2011 | Wilkes, II et al. | |
| 2013/0212175 A1* | 8/2013 | Cheng et al. | 709/204 |
| 2013/0289865 A1* | 10/2013 | Miller et al. | 701/119 |
| 2014/0354402 A1* | 12/2014 | Joao | 340/5.52 |

FOREIGN PATENT DOCUMENTS

| | | |
|---|---|---|
| WO | WO 01/91353 | 11/2001 |
| WO | WO 2008/151372 | 12/2008 |
| WO | WO/2008/151372 A1 | 12/2012 |

OTHER PUBLICATIONS

Indo Asian News Service, "Delhi traffic cops use Facebook, Twitter to nab offenders", found at http://www.ndtv.com/article/cities/delhi-traffic-cops-use-facebook-twitter-to-nab-offenders-35237, published online: Jul. 2, 2010.

* cited by examiner

ROGUE VEHICLE DETECTION

TECHNICAL FIELD

The present subject matter is related, in general to traffic violation analysis and, particularly but not exclusively, to detecting a rogue vehicle.

BACKGROUND

Traffic enforcement agencies are usually involved in monitoring traffic at several locations, and spontaneously enforcing traffic rules on noticing a violation of the same. Due to ever increasing occurrences of traffic violations, demand for vigilant traffic monitoring and enforcement is proportionately increasing. Furthermore, traffic monitoring systems may be provided at specific locations in order to continuously record movement of traffic and report traffic violations to relevant authorities.

Furthermore, in order to monitor individual driving patterns of a driver, static telemetric devices collect driving information of the vehicle. Subsequently, based on the driving pattern of the vehicle, the driver of the vehicle may be provided with certain benefits, which inherently encourages individuals to follow the traffic rules.

SUMMARY

This summary is provided to introduce concepts related to detecting a rogue vehicle, and the concepts are further described below in the detailed description. This summary is neither intended to identify essential features of the claimed subject matter nor is it intended for use in determining or limiting the scope of the claimed subject matter.

In one implementation, a method for rogue vehicle detection is provided. In one implementation, the method includes receiving at least one violation report for a vehicle from at least one mobile communication device. The at least one violation report is indicative of a traffic violation made by the one or more vehicles. The method further includes categorizing the vehicle as a rogue vehicle, based on at least one rogue vehicle detection metric, the at least one rogue vehicle detection metric being determined from the violation report. The method also includes compiling a traffic observation record based on at least one of the violation report and the rogue vehicle detection metric.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the drawings to reference like features and components.

DETAILED DESCRIPTION

Figure 1:
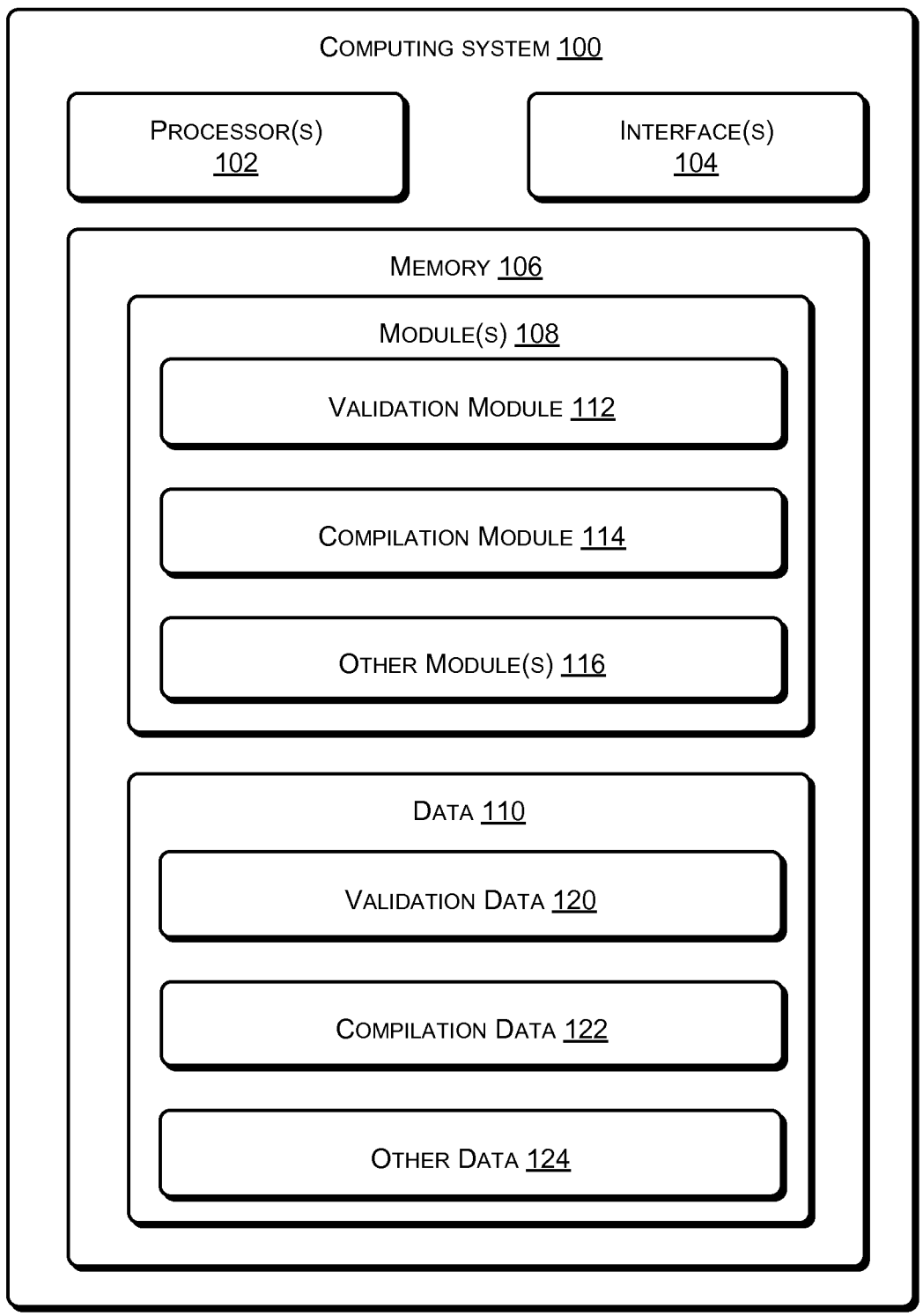
FIG. 1 illustrates a computing system for producing a traffic observation record, in accordance with an implementation of the present subject matter.

Systems and methods for detecting a rogue vehicle are described herein. The systems and methods can be implemented in a variety of mobile computing devices, such as laptops, tablet-PCs, and smart phones. Although the description herein is with reference to certain computing systems, the systems and methods may be implemented in other electronic devices, albeit with a few variations, as will be understood by a person skilled in the art.

Conventionally, the process of traffic monitoring and enforcement involves traffic agencies monitoring traffic at several locations. On noticing a traffic rule being violated, the traffic agencies apprehend the wrongdoer and enforce a fine or punishment or both relatively soon after. A level of involvement of such human agencies is generally limited due to a restricted number of human personnel accompanied with physical factors, for example, fatigue. The limited work force generally means a limited capability to monitor the ever increasing populace at a plurality of geographical locations at once. Therefore an automated traffic monitoring system is required.

These automated traffic monitoring systems are generally located at specified locations, such as, busy intersections, traffic heavy roads and the like. The traffic monitoring systems including, for example, a video camera, continuously monitor traffic flow and report potential traffic violations to relevant authorities. The traffic violations are generally reported in the form of a video or a plurality of images, which may be further processed to obtain data therein. The traffic monitoring systems are statically located, thus rendering their ability to detect traffic violations outside an optical range of the video camera ineffective. Moreover, the traffic violations are generally reported directed to law enforcement agencies that assess what type of action or proceedings need to be initiated against the violator.

Furthermore, in order to monitor individual driving patterns of a driver, vehicle mounted telemetric devices are known, which collect driving information of the vehicle and submit the information to a remote server. Subsequently, based on the driving pattern of the vehicle, the driver of the vehicle may provided with certain benefits, which inherently encourages individuals to be good drivers and not flout traffic rules. These telemetric devices however, are prone to tampering, where the devices are tampered such that they do not submit information regarding bad or poor driving behavior to the server.

The present subject matter discloses systems and methods for detecting a rogue vehicle. In one implementation, the method includes involving user participation for reporting a traffic violation. By involving users, such as pedestrians, citizens and drivers, a vast geographical area may be monitored for traffic violations. Furthermore, utilizing users as a source of information provides a dynamic monitoring method, where substantially high number of locations along with busy intersections and roads may be monitored.

In an implementation, a mobile communication device, such as a smart phone, may be used by a user to report the traffic violations. Hereinafter, the mobile communication device may interchangeably be referred to as a user device. In the implementation, the user may use the user device to record an image or a video of the traffic violation and report the same to a computing system, for example, a remote server. This report hereinafter, is referred to as the violation report, which may be indicative of a traffic violation.

In the case where the user submits the violation report in the form of an image, the image may contain a clear view of a registration plate of the vehicle that may be guilty of the violation. In an implementation, the computing system may extract data from the violation report, regarding vehicle details. In an example, the vehicle registration number may be used to extract registration details of the vehicle from a master database, such as a vehicle registry with the state department. The registration details may include a license category and type of vehicle. In an example, a color of the number plate may be indicative of the license category, such as commercial or private, of the vehicle. Furthermore, the type of the vehicle, such as, two wheeler, truck, car, bus, auto rickshaw etc. may be assessed from the extracted data based on an image characteristic.

In an implementation, the computing system assesses the violation report for authenticity. For example, based on the data extracted from the violation report, an authenticity metric may be computed, which in turn is indicative of whether the submitted violation report is authentic or not. In the former case, the violation report is taken up for further processing, and in the latter case, the report may be declined, and a message regarding the declination of the report may be sent to the user via the user device. In the implementation, the authenticity metric may be computed based on one or more authenticity parameters, which may be obtained from the violation report. In an example, the authenticity parameter can include GPS location data, a time stamp, an audio clip in case of video violation report, ambient environmental parameters, and third party parameters. In an example, the third party parameters may include but are not limited to police speed camera inputs of same rogue vehicle.

In an implementation, the authenticity metric is determined based on a weighted average of the above authenticity parameters. Further, a value of the authenticity metric is compared with a threshold authenticity value, and if the authenticity metric is above the threshold authenticity value, the violation report is accepted and taken up for further processing. On the other hand, if the authenticity metric is below the threshold authenticity value, the violation report is declined and a suitable notification may be sent to the user.

In an implementation, where the authenticity metric of the violation report is above the threshold authenticity value, a trustworthiness metric of the violation report may be computed. The trustworthiness metric of the violation report may be computed based on the authenticity metric and a trustworthiness parameter. Examples of trustworthiness parameter can include, but are not limited to, number of independent violation reports on the same violation incident, registration status and reputation level of the user who submitted the violation report, a rougeness index of the reportedly rogue vehicle, and a collusion index. In one example, the reputation level of a user may be a history of successful violation report submissions by the user. Furthermore, the collusion index may be referred to as a measure of a level of a collusion possibility. In one implementation, the trustworthiness metric is calculated based on the trustworthiness parameter using an empirical rule. In the case where the empirical rule evaluates to be TRUE, the violation report is accepted.

Furthermore, based on the violation report, the authenticity parameters, the authenticity metric, the trustworthiness parameters, and the trustworthiness metric, the vehicle may be categorized as rogue, and a traffic observation record is compiled. The traffic observation record may be forwarded to relevant agencies, depending on factors, such as nature and severity of violation, and the frequency of offence using the same vehicle. The relevant agencies can include, but are not limited to, fleet owners, traffic enforcement agencies, insurance providers, drivers in the immediate vicinity of rogue vehicle, and pedestrians. In an example, where the violating vehicle is a taxi, and the nature of the violation is severe, in addition to forwarding the traffic observation record to the fleet owner of the taxi car, the traffic police may be informed, as well as nearby pedestrians and drivers. In another example, for a violation report where the category of the violation may be drunken driving, the traffic police may be informed along with the insurance providers of the vehicle, and nearby pedestrians and drivers if the nature of the violation is severe. In one example, users may subscribe to an alert service on their user devices to receive alerts from the computing system for violations occurring in a location of a predefined radius. Furthermore, the user may customize the receiving of such alerts to include only certain categories of violations, such as drunken driving, over speeding and reckless driving.

According to the method of the present subject matter, by utilizing users to receive information regarding occurrences of traffic violations, a dynamic approach to achieving social harmony as well as the welfare of the society is promoted. Furthermore, the method of the present subject matter also encourages drivers to follow traffic rules due to a greater chance of detection and hence further prosecution. Moreover, the present subject matter facilitates a robust and tamper-proof traffic monitoring method, where the detection of the offender lies with a third party and not the offender himself.

These and other advantages of the present subject matter would be described in greater detail in conjunction with the following figures. While aspects of described systems and methods for the detection of the rogue vehicle can be implemented in any number of different computing systems, environments, and/or configurations, the embodiments are described in the context of the following exemplary system(s).

FIG. 1 illustrates a computing system 100 for detecting a rogue vehicle, as per one implementation of the present subject matter. In the implementation, the computing system 100 includes one or more processor(s) 102, interface(s) 104, and a memory 106 coupled to the processor 102. The processor 102 can be a single processing unit or a number of units, all of which could also include multiple computing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

The interfaces 104 may include a variety of software and hardware interfaces, for example, interface for peripheral device(s), such as a keyboard, a mouse, an external memory, and a printer. Further, the interfaces 104 may enable the computing system 100 to communicate with other computing devices, such as web servers and external databases in the communication network (not shown in the figure). The interfaces 104 may facilitate multiple communications within a wide variety of protocols and networks, such as a network, including wired networks, e.g., LAN, cable, etc., and wireless networks, e.g., WLAN, cellular, satellite, etc. The interfaces 104 may include one or more ports for connecting the computing system 100 to a number of computing devices.

The memory 106 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 also includes module(s) 108 and data 110.

The module(s) 108 include routines, programs, objects, components, data structures, etc., which perform particular tasks or implement particular abstract data types. In one implementation, the module(s) 108 includes a validation module 112, a compilation module 114, and other module(s) 116. The other module(s) 116 may include programs or coded instructions that supplement applications and functions of the computing system 100.

On the other hand, the data 110, inter alia serves as a repository for storing data processed, received, and generated by one or more of the module(s) 108. The data 110 includes, for example, validation data 120, compilation data 122, and other data 124. The other data 124 includes data generated as a result of the execution of one or more modules in the module(s) 108.

In one implementation, the computing system 100 can be configured to detect a rogue vehicle during operation. In the implementation, the validation module 112 receives one or more violation reports from one or more user devices, such as mobile communication devices. Users, such as pedestrians and drivers on the road, may utilize the user device to record an image or a video of a rogue vehicle. In this context, a rogue vehicle may refer to a vehicle, which may be violating traffic rules. In an example, a speeding vehicle may be a rogue vehicle, while in another example, a drunken driver driving recklessly on the road may indicate a rogue vehicle. The user may record an image or video of the rogue vehicle and provide the same as the violation report to computing system 100. In one example, in addition to recording the image or the video of the rogue vehicle, the user may also record a registration number by voice input. In this manner, even in the case where the user is unable to capture a clear image or video of a registration number of the rogue vehicle, the rogue vehicle may still be identified. The violation report contains data elements, such as a location of the incident, such as a Global Positioning System (GPS) location, time of occurrence of the incident, such as a time stamp, audio clip in case of video violation report, ambient environmental parameters temperature, weather, etc., application ID, nature and category of violation, and third party parameters (for example, police speed camera inputs of same rogue vehicle). In an example, the violation report may contain two types of data, vehicle data, i.e., data pertaining to details of the vehicle, and authenticity measurement data, which may be used to measure an authenticity of the submitted violation report. The vehicle data may be extracted from the violation report, such as vehicle color, registration number etc. In one implementation, the data may be obtained through inherent sensors in the user device. Furthermore, in one example, the above mentioned data elements may be utilized to derive authenticity parameters.

The recorded image or video must include a substantially clear view of the rogue vehicle registration number in order to facilitate further processing at the computing system 100. However, in case the vehicle registration number is not clearly captured, the computing system 100 may utilize the voice recording containing the registration number of the rogue vehicle as described above. Furthermore, the user device may embed the data, mentioned above, in the image or video using techniques, such as steganography, or digital watermarking, for robust and tamper proof transmission of the data contained therein. The validation module 112 receives the violation report and extracts the data from therein using image processing techniques. In one example, in order to obtain registration details of the vehicle from an image, the validation module 112 utilizes an extraction technique such as optical character recognition (OCR) to extract features of the registration number plate. In cases where an image of substantially lower quality is submitted by the user, in order to overcome potential errors during the OCR technique, a confidence measure for each character recognized by the OCR technique is evaluated. By utilizing the OCR technique in said manner, a robust identification of the vehicle may be facilitated. Furthermore, the voice input of the user may also be utilized in order to identify the registration number of the vehicle. In said manner, information such as a color of the number plate and the registration number may be extracted. In one implementation, the information extracted from the image or video is stored in the validation data 120. The validation data 120 further includes rules regarding the extraction technique to be used, as discussed earlier.

On extracting the data from the violation report, the validation module 112 utilizes the data, for example the registration number, to extract details of the vehicle from a master database, such as a vehicle registry of the state department. Furthermore, a license category and type of the vehicle may be ascertained with the data extracted from the image or video. In an example, a license category may be commercial or private. In another example, a type of vehicle may include but is not limited to, a bus, car, two-wheeler, auto rickshaw and a truck. The license category may be obtained from the vehicle register as mentioned earlier, and the type of vehicle may be obtained by an object classification algorithm through image processing.

Furthermore, the data extracted from the violation report may be stored in the validation data 120. Moreover, in an implementation, the GPS location of the user at the instance of recording the violation report may be obtained by the validation module 112. In an example, a GPS sensor of the user device may be used to obtain the location of the user, from where the violation report was submitted. Along with the data, the time stamp indicating the instance of the image or video capture is also included in the violation report.

In one implementation, the validation module 112 may extract an audio clip recorded at the time of recording the video of the violation report. In an example, the audio clip is extracted by validation module 112, and used to estimate an ambient noise level is procured. The ambient noise level may be stored in the validation data 120.

Furthermore, the validation module 112, extracts ambient environmental parameters (temperature, weather, etc.), from the violation report. In an example, these parameters may include but are not limited to, temperature and light intensity recorded, at the time of recording the image or video, by the sensors of the user device. Furthermore, such data may be stored in the validation data 120. In one example, the computing system 100 may use one or more of the above extracted authenticity measurement parameters in order to determine the authenticity of the violation report.

Moreover, the validation module 112, extracts a user ID of the user device that was used to send the violation report. In one example, the user ID is registered with the computing system 100 during communication of the user device with the computing system 100.

Further, the validation module 112 may also assess the nature and category of the violation from the violation report. In an example, the user may choose from a list of violations and a level of severity before submitting the violation report. A list of violations may include but is not limited to, reckless driving, drunken driving, traffic light violation, vehicle body defect, and misbehavior.

The validation module 112 may also extract third party parameters, for example, police speed camera inputs of the same rogue vehicle as indicated in a violation report submitted by a user using the user device. In an example, a rogue vehicle may be recorded using a police speed camera or jumping a red light, and subsequently or prior to this recording, the user may capture the same rogue vehicle violating the law and submit a violation report. In one example, the computing system 100 may verify and match the registration number from this violation report with the registration number obtained from the police speed camera report in order to assess if the rogue vehicle is the same or not.

In order to determine an authenticity of the submitted traffic violation report, the validation module 112 is configured to utilize each of the authenticity measurement data or data obtained as mentioned above, to determine an authenticity metric of the violation report. In an implementation, the authenticity metric may be indicative of an authenticity of the submitted violation report. Hereinafter, the authenticity measurement data extracted from the violation report as described above may be referred to as the authenticity parameters.

A value of each of the authenticity parameters may be determined by the validation module 112 based on configurable rules that may be stored in the validation data 120.

In one implementation, the validation module 112 measures a consistency of the GPS location recorded by the GPS sensor of the user device, with the location reported by a BTS at the time of recording the violation. Moreover, a location validation may also be measured against a location data provided by a network operator of the user device. The value of the authenticity parameter may be drawn from the above comparisons, which is indicative of consistency of the location of the user at the time of recording the violation. Furthermore, a time stamp of the recording of the violation is also included in the violation report in order to assess a time of occurrence of the violation.

In an example, where the location of the user as measured by the GPS sensor of the user device is at a distance greater than a threshold value from the distance as reported by the BTS's, the value of the authenticity parameter will be affected accordingly. Similarly, if the location measured with the network operator data is inconsistent beyond a threshold level of distance, the value of the authenticity parameter will be affected accordingly. The threshold value of distance may be stored in the validation data 120. In addition, the time stamp can be used to further assess the authenticity value of the parameter.

Furthermore, the validation module 112 may measure a value of the authenticity parameter of the ambient noise recorded during the time of recording the violation. In an example, an ambient noise may be compared with an expected road noise level, specific to the particular road and time of day. In an example, a database of the average noise levels at the specific roads at specific times of the day may be consulted to compare the ambient noise level estimated from the violation report. Similar to the authenticity parameter of the location of the user, a value may be attributed to the authenticity parameter of ambient noise and stored in the validation data 120.

Moreover, the validation module 112 may measure a value of an authenticity parameter related to violation reports recorded by other traffic monitoring systems, such as traffic police speed cameras. If, say, a traffic police speed camera records a rogue vehicle committing a speed limit offence, and subsequently or prior to this recording, a user captures the same rogue vehicle violating the law, then this information may be used as corroborative evidence against the rogue vehicle and contributes to the value of the authenticity parameter, which may be stored in the validation data 120.

Furthermore, the validation module 112 may measure a value of an authenticity parameter by comparing the temperature and light intensity measured during the recording of the violation, with expected values from, for example, weather data sources. In an example, if a temperature sensor records a temperature of 24° C., whereas the weather data source indicates that at the time and location of the transmission of the violation report, as taken from the time stamp and the location of the user at the time of recording the violation report, the ambient temperature was 32° C., then such a mismatch will negatively affect the value of the authenticity parameter.

Further, the validation module 112 may be configured to determine the authenticity metric based on a weighted average of the above individual values of the authenticity parameters. Weighing factors may be attributed to each of the authenticity parameters and may be stored in the validation data 120. The weighing factors are indicative of an importance of each of the authenticity parameters. In an example, the authenticity parameter of the location may be attributed with a higher weightage than the authenticity parameter regarding ambient light and temperature.

In an example, the following equation may be used to determine the weighted average of the authenticity parameters for determining the authenticity metric.

$$Q = \frac{\sum_{i=1}^{N} w_i [d_i]}{N}$$

In the above equation, Q is the authenticity metric, $d_i$ is a Boolean result of the $i^{th}$ parameter validation, $w_i$ is the weight associated with a validation result of $i^{th}$ authenticity parameter, and N is the total number of authenticity parameters used. In an example, the weight $w_i$ is dynamically assessed and associated with the validation result of the $i^{th}$ authenticity parameter.

According to an implementation, if the value of the authenticity metric Q is above a threshold then the submitted violation report is accepted. The threshold value of the authenticity metric may be predefined and stored in the validation data 120. In the event that the authenticity metric Q is below the threshold, the violation report may be declined and a suitable alert may be sent to the user, notifying him of the failure of the submission of the violation report.

Subsequent to the determination of the authenticity metric, the validation module 112 is configured to compute a trustworthiness metric for the violation report. The trustworthiness metric may be considered to be indicative of a level of credibility of the violation report, and the trustworthiness metric may be computed based on the authenticity metric and one or more trustworthiness parameters. Furthermore, rules for computing the trustworthiness metric may be stored in the validation data 120.

In an implementation, the trustworthiness parameters, include but are not limited to, number of independent violation reports on the same violation incident, registration status and reputation level of the user who submitted the violation report, collusion index, and a rogueness index of the reportedly rogue vehicle. In an example, the reputation level of the user may be a value indicating the number of successful violation reports submitted by the user, and the rogueness index is a measure of the number of violations by the rogue vehicle over time.

In an example, if the computing system 100 receives more than one violation report with regard to the same rogue vehicle, this will increase the number of violation reports on the same violation incident, and in turn, can increase a value of this trustworthiness parameter. Furthermore, in an implementation, the validation module 112 can be configured to determine the collusion index regarding the multitude of violation reports regarding the same rogue vehicle. In an example, the validation module 112 may assess the collusion index for the multitude of violation reports in the following manner:

wait for a specified time period from a first violation report to collect the entirety of violation reports related to a specific rogue vehicle;

prepare a list of users 'p' who have submitted violation reports against the same rogue vehicle, for the same or similar violations. For example, a user 'A' may report a rogue vehicle for a drunken driving violation, whereas a user 'B' may report the same rogue vehicle for a reckless driving violation. In such a case, the users A and B can be listed under the same list;

from the recent history, extract the number of occasions 'N', where the same set of users were involved in reporting violations against the same vehicle; and compare the number 'N' with a threshold value, say '$N_t$'.

If the number 'N' is greater than the threshold value '$N_t$', then collusion is suspected and the violation report is marked accordingly.

Furthermore, the validation module 112 assesses the reputation level of the user who submitted the violation report. In an example, the reputation level of the user is assessed by fetching data regarding the number of successful violation reports reported by the user. In a further example, a percentage value of a number of successful violation reports versus a number of unsuccessful violation reports is determined to assess the reputation level of the user.

Moreover, the validation module 112 is configured to determine the rogueness index for the rogue vehicle, where the rogueness index is a measure of a driving behavior of a vehicle with respect to time. For example, for each successful violation reported against a rogue vehicle, the rogueness index for the vehicle will increase. However, the rogueness index will diminish with time in the case where no fresh violation reports are submitted against the rogue vehicle. In another example, depending on the severity of the offence committed by the driver, the rogueness index is affected correspondingly. In the case of an offence of minor severity, the rogueness index does not rise substantially, and a duration of remembering the event, i.e. the offence is substantially small. However, in the case of an offence of major severity, the rogueness index rises substantially, and the duration of remembering the event is substantially large. In the latter case, the time taken for the rogueness index is longer than in the former case, where the rogueness index diminishes substantially quicker.

In another example, the rogueness index of the vehicle may be calculated using the following equation.

$$R(t) = \sum_{i=1}^{N} -0.5 w_i \text{erf}\left(\frac{-(t-\tau_i)}{\sqrt{2}} + T_i\right) + 0.5$$

In the above equation, R(t) is the rogueness index and is a function of time; i is the number of independent incidents reported; $w_i$ is a weightage associated with the severity of one or more of the number of independent incidents i; erf is the error function, $\tau_i$ is a time at which the incident occurred; and $T_i$ is a factor indicating a duration of remembering the $i^{th}$ event. In other words, the rogueness index is a time decaying function, where the value of rogueness index diminishes over time on receiving no more violation reports against the rogue vehicle.

Figure 1A:
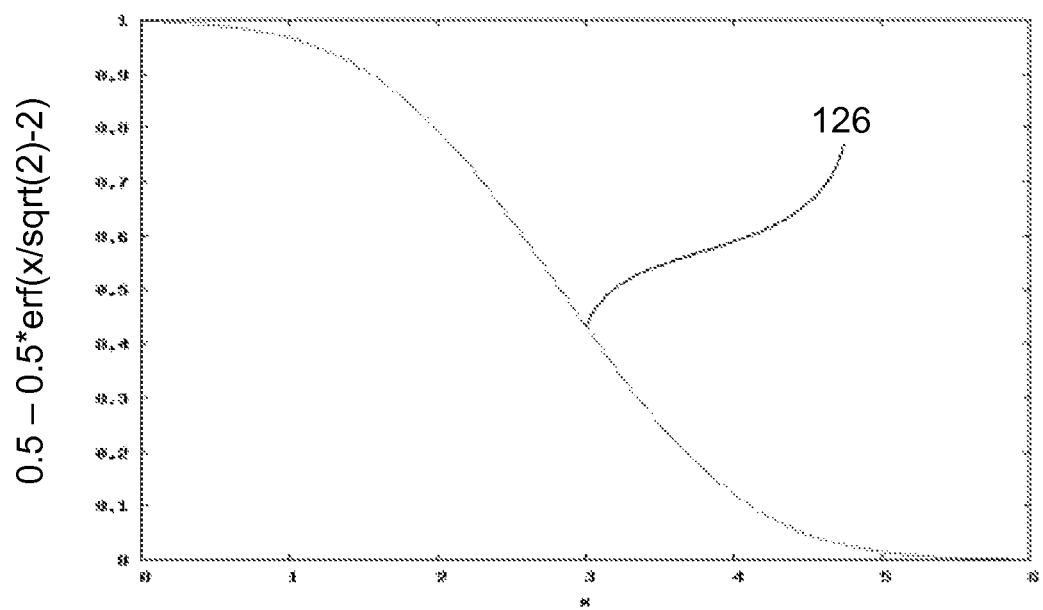
FIG. 1a illustrates a plot of rogueness index of a vehicle, in accordance with an implementation of the present subject matter.

The variation in rogueness index with time, as described above, is depicted with reference to a plot shown in FIG. 1a, in accordance with an implementation of the present subject matter. Here, an X axis shows time in months, and a Y axis represents the rogueness index according to the equation described above. A curve 126 shows the plot of the rogueness index versus time, where N=1, and T=2 months. As shown in the curve 126, the rogueness index diminishes over the time period of T=2 months, and on no subsequent violation reports, reaches zero.

On obtaining the above mentioned trustworthiness parameters, the validation module 112 calculates the trustworthiness metric using an empirical formula. In the case where the empirical rule evaluates to be TRUE, the violation report is accepted. In cases otherwise, the user may be notified via a message on an unsuccessful violation report.

Furthermore, on obtaining the trustworthiness metric, the compilation module 114 compiles a traffic observation record. In an example, the traffic observation record can include, but is not limited to the data extracted by the validation module 112, from the violation report, such as the GPS location, time stamp, registration number of vehicle, owner details, color of vehicle, make of vehicle, license category, type of vehicle, the authenticity parameters, the trustworthiness parameters, nature and category of violation, and the trustworthiness metric. The traffic observation record may be stored in the compilation data 122.

In an example, the trustworthiness metric can be computed as:

$$T_m = \sum_{k=1}^{k=K} Q_{ik} P_k (1. - \text{erf}(0.2 + R(\tau))(1 - \delta_c)$$

Where $T_m$ is the trust index, Q is the authenticity metric, P is reputation of the user who has submitted the report, $R(\tau)$ is the rogueness index of the vehicle, where $R(\tau)$ is a rogueness index measured at an instant $\tau$, and $\delta_c$ is the collusion index. In the above equation, collusion index will be 1 if there is a collusion detected and 0 otherwise. The rogueness index will be a number greater than or equal to zero. erf is the error function.

In an example, the compilation module 114 may compile the traffic observation record in the form of a tabulated report, with the data classified into groups. In an example, the groups may include but are not limited to, nature and type of offence, rogue vehicle history, vehicle particulars, circumstances of the offence (time, date, location etc.), and other parameters.

Moreover, the compilation module 114 may be configured to forward the traffic observation record to relevant agencies depending on one or more parameters. For example, the compilation module 114 may forward the traffic observation record to other users who may be subscribed to an alert service on their user devices. In another example, based on the category and nature of the violation, the compilation module 114 may forward the traffic observation record selectively to certain agencies. For a drunken driving violation category, the compilation module 114 may forward the traffic observation record to an insurance provider (of the rogue vehicle), the state traffic police, and the pedestrians and drivers in the vicinity who are subscribed to the alert service. In another example, for a drunken driving violation category, in a case where the vehicle license category is 'commercial', in addition to the above mentioned agencies, the compilation module 114 may forward the traffic observation record to the owner of the company to which the commercial vehicle belongs.

Although the detection of the rogue vehicle has been described above with respect to a particular order, i.e., determination of the authenticity metric, followed by the computation of the trustworthiness metric, the computing system 100 is not to be limited to this order. In other words, a person skilled in the art would appreciate that the detection of the rogue vehicle can be facilitated by at least one rogue vehicle detection metric. The rogue vehicle detection metric can be the authenticity metric, or the trustworthiness metric, or a combination of both. In other words, the rogue vehicle may be detected, i.e., the vehicle may be categorized as rogue, by utilizing at least one of the authenticity parameters, or the trustworthiness parameters, or a combination of both.

Furthermore, in an example, the computing system 100 may be implemented at a third party service provider. The third party service provider may offer subscription services to customers, such as, individuals and insurance agencies, as well as state departments, such as, traffic enforcement agencies. In this example, the traffic enforcement agencies may utilize information provided by the computing system 100 about a particular rogue vehicle in order to provide a suitable penalty. For example, in the case of a rogue vehicle being detected, the traffic enforcement officer may consider the rogueness index of the vehicle, and the reputation level of the vehicle, as well as the history of the offences of the vehicle before deciding a suitable penalty. Furthermore, in this example, the services offered by the third party service provider may be suggestive in nature to the traffic enforcement agencies.

In another example, the computing system 100 may be implemented by the government itself, such as at various state departments. In this example, the computing system 100 may be adapted by the traffic enforcement agency itself and the agency may utilize the information provided by the computing system 100 in order to provide a suitable penalty to the rogue vehicle. In this case, the information provided by the computing system to the traffic enforcement agency may be binding on the rogue vehicle, i.e., in contrast to the earlier case where the information provided by the third party service provider was merely suggestive in nature. In a further example, the compilation module 114 may be configured to impose the penalty based on the rogueness index as described above.

In both the examples cited above, the owner of the rogue vehicle may contest the allegations against him by providing suitable counter evidences.

Figure 2:
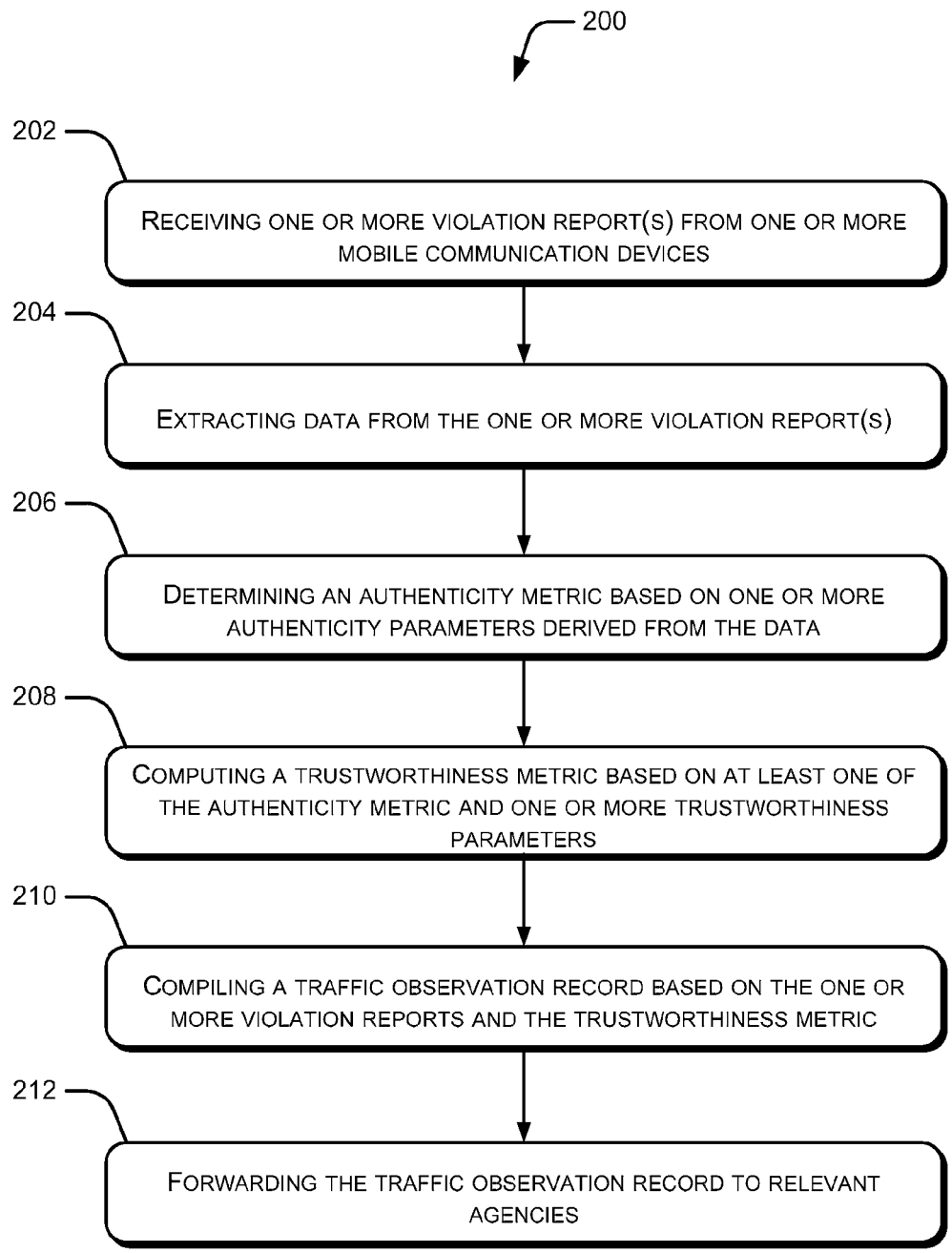
FIG. 2 illustrates a method for producing a traffic observation record, in accordance with an implementation of the present subject matter.

FIG. 2 illustrates a method 200 for producing a traffic observation record, according to one embodiment of the present subject matter. The method 200 may be implemented in a variety of computing systems, mentioned in description of FIG. 1, in several different ways. For example, the method 200, described herein, may be implemented using the computing system 100, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the computing system 100, the description may be extended to other systems as well.

The method 200 is initiated at a block 202, where one or more violation reports may be received from a user device. The user device such as laptops, tablet-PCs and smart phones, may be configured to record and upload the traffic violation report to a remote server. The user device can be utilized to record the occurrence of a traffic violation in the form of an image or a video and uploaded via a suitable method to a computing system, such as a remote server where the violation report may be processed further. In an example, a user may notice a vehicle misbehaving or violating a traffic rule. This vehicle may be referred to as a rogue vehicle hereinafter.

At block 204, data may be extracted from one or more of the violation reports. The data may be suitably embedded in the violation reports with a technique such as, steganography or digital watermarking. Steganography is a method by which information may be concealed within computer files. In digital steganography, electronic communications may include steganographic coding inside of a transport layer, such as, a document file and an image file. Digital watermarking is the process of embedding information into a digital signal. In digital watermarking, the signal may be audio, pictures, or video. Moreover, a signal may carry several different watermarks at the same time. Once the violation report with the image or the video of the rogue vehicle is received at the computing system, the computing system extracts said data from the violation report. As described earlier, the data may include vehicle data and authenticity measurement data. In an example, the data includes, but is not limited to, a time stamp of the occurrence of the violation, a location of the violation, audio clip (in case of video violation report), ambient environmental parameters, and third party parameters (for example, police speed camera inputs of same rogue vehicle).

In one implementation, the location may be provided by a GPS sensor in the user device, and a location determined using BTS signals in the vicinity. Furthermore, in an example, the audio clip may be the audio from the video recording in the violation report. The ambient environmental parameters may include an ambient temperature and light intensity as recorded by the sensors of the mobile communication device. The third party parameters may include inputs regarding the same rogue vehicle from other traffic monitoring systems, such as, police speed cameras and traffic intersection cameras that continuously monitor traffic flow. For example, a user may notice a vehicle driving recklessly on a road and submit a violation report regarding the same, and additionally, the same rogue vehicle may violate traffic rules at an intersection where a traffic intersection camera is situated and subsequently records the same rogue vehicle. As described earlier, the registration numbers of the rogue vehicle in both instances may be compared in order to verify a match.

At block 206, an authenticity metric may be determined based on the data mentioned above. In an example, one or more of the authenticity measurement data may be used to derive the authenticity parameters. The authenticity measurement data may be measured for consistency against one or more reference values. In an example, the GPS location from a GPS sensor of the user device may be compared with a GPS location from BTS signals in the vicinity. The same may be used to corroborate the location of the user at the time of recording the violation report.

In an implementation, a value of the authenticity metric may be determined using a weighted average technique as described earlier. The value of the authenticity metric is then compared with a threshold value and in the case where the value of the authenticity metric is above the threshold value, the validation report is taken up for further processing. In the case where the value of the authenticity metric is below the threshold value, the validity report is declined and a suitable notification may be sent to the user, for example, via the user device.

At block 208, a trustworthiness metric of the violation report is computed, where a value of the trustworthiness metric may be indicative of a credibility of the validity report. The trustworthiness metric of the violation report may be computed based on the authenticity metric and at least one trustworthiness parameter. Examples of trustworthiness parameters include, but are not limited to, number of independent violation reports on the same violation incident, registration status and reputation level of the user who submitted the violation report, and a rogueness index of the reportedly rogue vehicle.

For example, in a case where more than one violation reports are received regarding the same vehicle, the trustworthiness parameter for the same can be influenced in a positive manner. In said example, a rogue vehicle violating the speed limit may be spotted by more than one user, and subsequently, each of the users may submit a violation report regarding the rogue vehicle. In such a case, the corresponding trustworthiness metric for each of the violation reports may be affected in a positive manner.

Moreover, in another example, a reputation level of the user who submits the violation report is assessed. In an example, the reputation level is a value indicating a number of successful violation reports submitted by the user. In an example, the higher the number of the successful violation reports, the greater the reputation level of the user, in which case, the trustworthiness metric may be positively influenced.

Furthermore, the rogueness index of the vehicle may also be computed in order to calculate the trustworthiness metric. The rogueness index of a vehicle can be used as a measure of driving behavior of the driver of the rogue vehicle. In an example, the rogueness index is a function of time, where with each successful violation report against said rogue vehicle, the rogueness index increases. However, the rogueness index may diminish with time, and in the case where there is no subsequent violation reports are submitted against the rogue vehicle, the rogueness index may diminish to nil, i.e., all the violation reports are forgotten.

The value of the trustworthiness metric is subsequently calculated using an empirical rule as previously described. When the rule evaluates as TRUE, the violation report is accepted and taken up for further processing. However, on failing the rule, the violation report is declined from further processing and the user may be informed by a suitable notification as described earlier.

At block 210, a traffic observation record may be compiled. In an example, the traffic observation record is compiled based on the data extracted from the violation report, such as, the location of the violation, time stamp, color of vehicle, make of vehicle, license category, type of vehicle, the authenticity parameters, the trustworthiness parameters, nature and category of violation, and the trustworthiness metric. In an example, the traffic observation record may be compiled in the form of tabulated data that facilitates easy understanding of the information portrayed.

At a block 212, the traffic observation record may be forwarded to relevant agencies based on one or more factors. In an example, the traffic observation record is forwarded depending on factors, such as, nature and severity of violation, and the registration details of vehicle. The relevant agencies can include but are not limited to, fleet owners, traffic enforcement agencies, insurance providers, drivers in the immediate vicinity of rogue vehicle, and pedestrians. For example, where the rogue vehicle is a commercial vehicle, the company that owns the vehicle may be provided with the observation record. In another example, where a private vehicle is reported for drunken or reckless driving, the driver of the vehicle, if registered with the computing system, may also be notified of his offence. In furtherance to the driver being informed, nearby drivers and pedestrians who may be subscribed to an alert service may also be informed of the rogue vehicle. These drivers and pedestrians in turn can now be vigilant, and be aware of the presence of a rogue vehicle in their neighborhood. Furthermore, they can be encouraged to take precautionary measures and be prepared to report any repeated offences from the rogue vehicle. In this manner, the welfare and safety of citizens can be promoted, and drivers may be encouraged to follow traffic rules and laws. In another example, an insurance provider of the rogue vehicle may also be notified of the rogue vehicle's offence. In this manner, the insurance provider may be assisted in providing claim details, or insurance details based on the nature and category of the offence.

In an example, based on a violation report, the traffic enforcement agency may charge the guilty rogue vehicle with a penalty based on its rogueness index as described earlier. A vehicle with a high rogue index can be charged a higher penalty amount as compared to a vehicle with a low index vehicle. Further, in an example, for all the reported violations a penalty can be automatically charged as described earlier. Further, the accused rogue vehicle owner can be provided with an opportunity to contest the allegations made against him, by submitting counter evidence. For example, the counter evidences could be retrieved from a telemetric device present in the vehicle that can provide authenticated data. Moreover, state departments can mandate special training or orientation sessions for the drivers of rogue vehicles in order to educate them. This will improve the efficacy of targeted educational awareness for the people who need improvement in their driving behavior. Further the traffic department can plan the required infrastructure measures for reducing violations. This includes deploying surveillance systems, police personnel, traffic lights, patrolling etc. in regions where violation density is high.

In an example, an owner of a rogue vehicle, such as, a fleet owner, can receive feedback regarding the driving behavior of the vehicles in the fleet. This will enable corrective measures to be taken in case of substantially high occurrences of violation reports against a particular vehicle. Furthermore, in the case, the violation reports can be cross checked with the driver roster and the identification of the driver responsible for the incident can be facilitated. Furthermore this can be linked to a computation of the rogueness index for the drivers of the fleet and suitable action can be taken for the drivers of the rogue vehicle.

In an implementation, in order to ensure privacy of the driver of the allegedly rogue driver, only the vehicle may be identified. In an example, during the recording of a traffic offence, where the driver is included in the image or video, the same may be excluded from the processing of the image or video. In this example, only the details necessary for the identification of the rogue vehicle may be included in the processing steps. Moreover, in another example, the privacy of a reporter, i.e., the user submitting the violation report can be ensured by controlled disclosure of their identity to the reportees.

In another implementation, users may enlist as part of a citizen sensor program, which motivates users to report occurrences of traffic occurrences. The users enlisted on this program, hereinafter referred to as citizen sensors, may be provided with suitable incentives. Beyond public visibility, awareness, sense of social contribution etc., a rewarding scheme can be conceptualized to encourage people to be citizen sensors.

In one example, for each successful submission of a violation report, the citizen sensors may be awarded rewards according to an award point system. In an example, the compilation module 114 may be configured to allot award points to the citizen sensors, for each of their violation report submissions. The number of points awarded may depend on the rogue vehicle detection metric, or the severity of the incident, or order of reporting (for example, a first number of the violation reports for a specific incident can receive a higher number of points as compared to the violation reports received subsequently).

Furthermore, in an example, the award points can be redeemed for discounted payment for toll tax (road tax), penalties/fines to traffic dept, congestion tax, free tickets for public transport systems, vehicle insurance premium, and other such incentives.

Although implementations for rogue vehicle detection have been described in language specific to structural features and/or methods, it is to be understood that the present subject matter is not necessarily limited to the specific features or methods described. Rather, the specific features and methods are disclosed as implementations for rogue vehicle detection.

We claim:

1. A method for rogue vehicle detection, the method comprising:
   receiving at least one violation report for a vehicle from at least one mobile communication device, wherein the at least one violation report is indicative of a traffic violation made by one or more vehicles, and wherein the at least one violation report includes data elements of the vehicle;
   extracting the data elements from the at least one violation report for the vehicle;
   authenticating the at least one violation report based on an authenticity metric, wherein a value of the authenticity metric is computed by comparing the extracted data elements with reference authenticity measurement data, the reference authenticity measurement data indicates conditions pertaining to a location from which violation by the vehicle is reported;
   determining trustworthiness of the at least one violation report using a trustworthiness metric, wherein the trustworthiness metric is based on the authenticity metric and trustworthiness parameters;
   categorizing the vehicle as a rogue vehicle, based on the authenticating and the determining trustworthiness; and
   compiling a traffic observation record of the rogue vehicle based on at least one of the at least one violation report, the authenticity metric, and the trustworthiness metric.

2. The method as claimed in claim 1, wherein the at least one violation report comprises one or more authenticity parameters, the authenticity parameter comprises at least one of a time stamp, a GPS location, an audio clip, an ambient environmental parameter, and one or more third party parameters.

3. The method as claimed in claim 1, wherein the trustworthiness parameters include at least one of a number of independent violation reports of the same violation incident, registration status of a user, reputation level of the user, a rogueness index of the vehicle, and a collusion index.

4. The method as claimed in claim 3, wherein the rogueness index of the vehicle is a time dependent function.

5. The method as claimed in claim 1, further comprising forwarding the traffic observation record to at least one agency based on a type of traffic violation and a severity of the traffic violation, wherein the at least one agency includes at least one of an insurance agency, vehicle fleet owner, state department, traffic enforcement agency, and an individual user.

6. A computing system for detecting a rogue vehicle, the system comprising:
   a processor; and
   a memory coupled to the processor for executing a plurality of modules present in the memory, the plurality of modules comprising:
   a validation module for:
   receiving at least one violation report from at least one mobile communication device, wherein the at least one violation report is indicative of traffic violation made by one or more vehicles, and wherein the at least one violation report includes data elements of the vehicle;
   extracting the data elements from the at least one violation report for the vehicle;
   authenticating the at least one violation report based on an authenticity metric, wherein a value of the authenticity metric is computed by comparing the extracted data elements with reference authenticity measurement data, the reference authenticity measurement data indicates conditions pertaining to a location from which violation by the vehicle is reported;
   determining trustworthiness of the at least one violation report using a trustworthiness metric, wherein the trustworthiness metric is based on the authenticity metric and trustworthiness parameters; and
   categorizing the vehicle as a rogue vehicle, based on the authenticating and the determining trustworthiness;
   a compilation module for compiling a traffic observation record of the rogue vehicle based on the at least one violation report, the authenticity metric, and the trustworthiness metric.

7. The computing system as claimed in claim 6, wherein the computing system is implemented at least at one of a third party service provider and a state department.

8. The computing system as claimed in claim 6, wherein the validation module further rejects the at least one violation report based on a comparison of a value of the authenticity metric with a value of a threshold authenticity metric.

9. The computing system as claimed in claim 6, wherein the validation module further determines a collusion index of the at least one violation report, wherein the collusion index is indicative of a level of collusion of a plurality of submitted violation reports regarding the rogue vehicle.

10. The computing system as claimed in claim 6, wherein the compilation module further forwards the traffic observation record to at least one agency based on a type of traffic violation and a severity of the traffic violation.

11. The computing system as claimed in claim 6, wherein the compilation module further forwards an alert based on the traffic observation record to a user within a predetermined radius of a location of a violation incident.

12. The computing system as claimed in claim 6, wherein the compilation module further imposes a penalty against the rogue vehicle based on a rogueness index of the rogue vehicle.

13. The computing system as claimed in claim 6, wherein the compilation module allots award points to a user based on at least one of a number of violation reports submitted by the user, a nature of the violation, and a severity of the violation, and wherein a redeeming of the award points by the user is facilitated.

14. A non-transitory computer-readable medium having embodied thereon a computer program for executing a method comprising:

receiving at least one violation report for a vehicle from at least one mobile communication device, wherein the at least one violation report is indicative of a traffic violation made by one or more vehicles, and wherein the at least one violation report includes data elements of the vehicle;

extracting the data elements from the at least one violation report for the vehicle;

authenticating the at least one violation report based on an authenticity metric, wherein, a value of the authenticity metric is computed by comparing the extracted data elements with reference authenticity measurement data, the reference authenticity measurement data indicates conditions pertaining to a location from which violation by the vehicle is reported;

determining trustworthiness of the at least one violation report using a trustworthiness metric, wherein the trustworthiness metric is based on the authenticity metric and trustworthiness parameters;

categorizing the vehicle as a rogue vehicle, based on the authenticating and the determining trustworthiness; and compiling a traffic observation record of the rogue vehicle based on at least one of the violation report, the authenticity metric, and the trustworthiness metric.

* * * * *